United States Patent [19]
Hamlin

[11] 4,186,614
[45] Feb. 5, 1980

[54] FORCE AND DISTANCE MULTIPLYING OBLIQUE LEVERAGE TRANSMISSION

[76] Inventor: Fred A. Hamlin, 2957 Henrietta St., La Crescenta, Calif. 91208

[21] Appl. No.: 931,792

[22] Filed: Aug. 7, 1978

[51] Int. Cl.² ............................................ F16H 21/12
[52] U.S. Cl. ...................................................... 74/63
[58] Field of Search .................. 74/63, 67, 69, 66, 65, 74/84 R, 44, 53

[56] References Cited

U.S. PATENT DOCUMENTS

| | | | |
|---|---|---|---|
| 2,223,743 | 12/1940 | Stalker | 74/63 |
| 2,621,495 | 12/1952 | Garbarini | 74/63 X |
| 3,745,865 | 7/1973 | Johnson | 74/69 X |

FOREIGN PATENT DOCUMENTS

| | | | |
|---|---|---|---|
| 543776 | 6/1921 | France | 74/69 |
| 901584 | 11/1944 | France | 74/69 |

*Primary Examiner*—Ramon S. Britts
*Attorney, Agent, or Firm*—Nilsson, Robbins, Dalgarn, Berliner, Carson & Wurst

[57] ABSTRACT

An oblique leverage transmission has a first drive shaft coupled to rotate a first bevel drive gear and first and second force transfer bevel gears in an epicyclic gear train arrangement. A second drive shaft is coupled to be rotated by a second bevel drive gear which is rotated by third and fourth force transfer bevel gears positioned about the periphery of the drive gear also in an epicyclic gear train arrangement. A first connecting rod is eccentrically coupled between the first force transfer gear and a first load transfer means movably positioned on a first inclined plane. A third connecting rod is eccentrically coupled between the third force transfer gear and the first load transfer means. Second and fourth connecting rods are eccentrically coupled between the second and fourth force transfer gears respectively and a second load transfer means movably positioned on a second inclined plane. The eccentric positioning of the connecting rods on the force transfer gears is such that the first and second load transfer means are moving in opposite horizontal directions.

16 Claims, 3 Drawing Figures

FORCE AND DISTANCE MULTIPLYING OBLIQUE LEVERAGE TRANSMISSION

BACKGROUND OF THE INVENTION

The present invention relates to transmission devices, and in particular, to oblique leverage transmissions incorporating two epicycle gear train arrangements between which is coupled a pair of oppositely positioned load transfer carriages positioned to move up and down two inclined planes at angles of $\theta$ and $180° - \theta$, respectively.

Various transmission devices utilizing epicyclic gear arrangements are known in the art. The present invention utilizes the principles of the wheel and axle, the inclined plane and the lever to provide a novel transmission device. In addition, the transmission device of the present invention may include weights positioned around the periphery of one or both drive gears or one or more force transfer gears to provide energy storage utilizing the principles of the flywheel. Additional energy storage capability is provided by the weight of the respective load transfer means when they are positioned at the point of maximum potential energy along the inclined planes.

SUMMARY OF THE INVENTION

The present inventon comprises an oblique leverage transmission for transferring rotational work energy from a first shaft to a second shaft and comprises a first gearing means which is coupled for being rotated by the first shaft. The first gearing means comprises a first force transfer gear and a second force transfer gear which are rotatable in response to the rotation of the first shaft. A second gearing means comprises a third force transfer gear and a fourth transfer gear which are coupled to the second shaft. The second shaft rotates in response to the rotation of the third force transfer gear and the fourth force transfer gear.

Coupled between the first gearing means and the second gearing is an incline plane means which comprises a first incline plane positioned between the first and the third force transfer gears and a second incline plane positioned between the second and the fourth force transfer gears. Linkage means are provided comprising a first load transfer means coupled for being moved linearly up and down a first incline plane in response to the rotation of the first force transfer gear. The first load transfer means is also coupled to rotate the third force transfer gear as the first load transfer means moves linearly up and down the incline plane.

A second load transfer means is also coupled for being moved linearly up and down second incline plane in response to the rotation of the second force transfer gear and is further coupled for rotating the fourth force transfer gear as the second load transfer means moves linearly up and down the incline plane.

In one embodiment, the first gearing means further comprises a first drive gear which is fixed for being rotated by the first shaft where the first drive gear, the first force transfer gear and the second force transfer gear are bevel gears positioned in an epicyclic gear train arrangement. Thus, the first force transfer gear is meshed with the first drive gear at a first location and the second force transfer gear is meshed with the first drive gear at a second location opposite to the first location.

The second gearing means is similarly configured comprising a second drive gear for rotating the second shaft. The second drive gear, the third force transfer gear and the fourth force transfer gear are also bevel gears in an epicyclic gear train arrangement where the third force transfer gear is meshed with the second drive gear at a third location and the fourth force transfer gear is meshed with the second drive gear at a fourth location opposite the third location.

In one particular arrangement, the various gear ratios of the force transfer gears and the drive gears are selected so that the first and the second force transfer gears rotate at an angular rate greater than the angular rate rotation of the first drive gear.

Each incline plane utilized in the present invention and upon which the respective load transfer carriages slide, may be positioned at any angle but preferably have an angle, as viewed looking toward the backside of the force transfer gears interconnected with the carriage on that inclined plane, greater than 0 degrees and less than about 45° relative to a horizontal plane parallel to the axis of rotation of the first drive shaft. However, in the preferred embodiment, the angle is 30°.

The present invention may also incorporate one or more weights fixed to the periphery of at least one of the first and second drive gears for providing a flywheel energy storage means.

In order to move the load transfer means up and down the incline plane, the transmission may further comprise a first connecting rod eccentrically coupled at one of its ends to the first force transfer gear and at the other of its ends to the first load transfer means. A third connecting rod is eccentrically coupled at one of its ends to the third force transfer gear and at the other of its ends to the first load transfer means. Opposite to the first load transfer means, a second connecting rod is eccentrically coupled at one of its ends to the second force transfer gear and at the other of its ends to the second load transfer means. A fourth connecting rod is eccentrically coupled at one of its ends to the fourth force transfer gear and at the other of its ends to the second load transfer means. The eccentric coupling of the first connecting rod and the second connecting rod is such that the horizontal component of motion of the load transfer carriages relative to the axis of rotation of the first drive gear along the respective incline planes, is in opposite directions.

Each of the load transfer means preferably incorporates the principles of a second class lever. Thus, the first load transfer means comprises a carriage assembly attached to the other end of the first connecting rod and has a rotatably mounted wheel for rolling along the underside of the first incline plane member. A force arm connection is positioned on the carriage assembly above the top side of the first incline plane. A second class lever assembly is pivotally attached to the force arm connection at an upper region. The lever assembly also has a center region to which is attached the other end of the third connecting rod, and a lower region along which are attached at least two spaced wheels. The spaced wheels are rotatably connected for rolling along the top side of the first incline plane as the first connecting rod reciprocate.

The second load transfer means is oppositely configured to move up and down the second incline plane and comprises a carriage assembly attached to the other end of the fourth connecting rod. A rotatably mounted wheel is attached to the carriage assembly to roll along the underside of the second incline plane member. A force arm connection is positioned on the carriage assembly above the top side of the second incline plane. A second class lever assembly is pivotably attached to the force arm connection at a center region of the second class lever assembly relative to the incline plane. The lever assembly has an upper region to which is attached the other end of the second connecting rod, and a lower region along which are attached at least two spaced wheels. The spaced wheels are rotatably connected for rolling along the top side of the second incline plane as the second connecting rod reciprocate.

BRIEF DESCRIPTION OF THE DRAWINGS

The invention will be better understood from the detailed description below taken in conjunction with the drawings wherein like reference characters refer to like parts throughout and in which.

DETAILED DESCRIPTION

Figure 1:
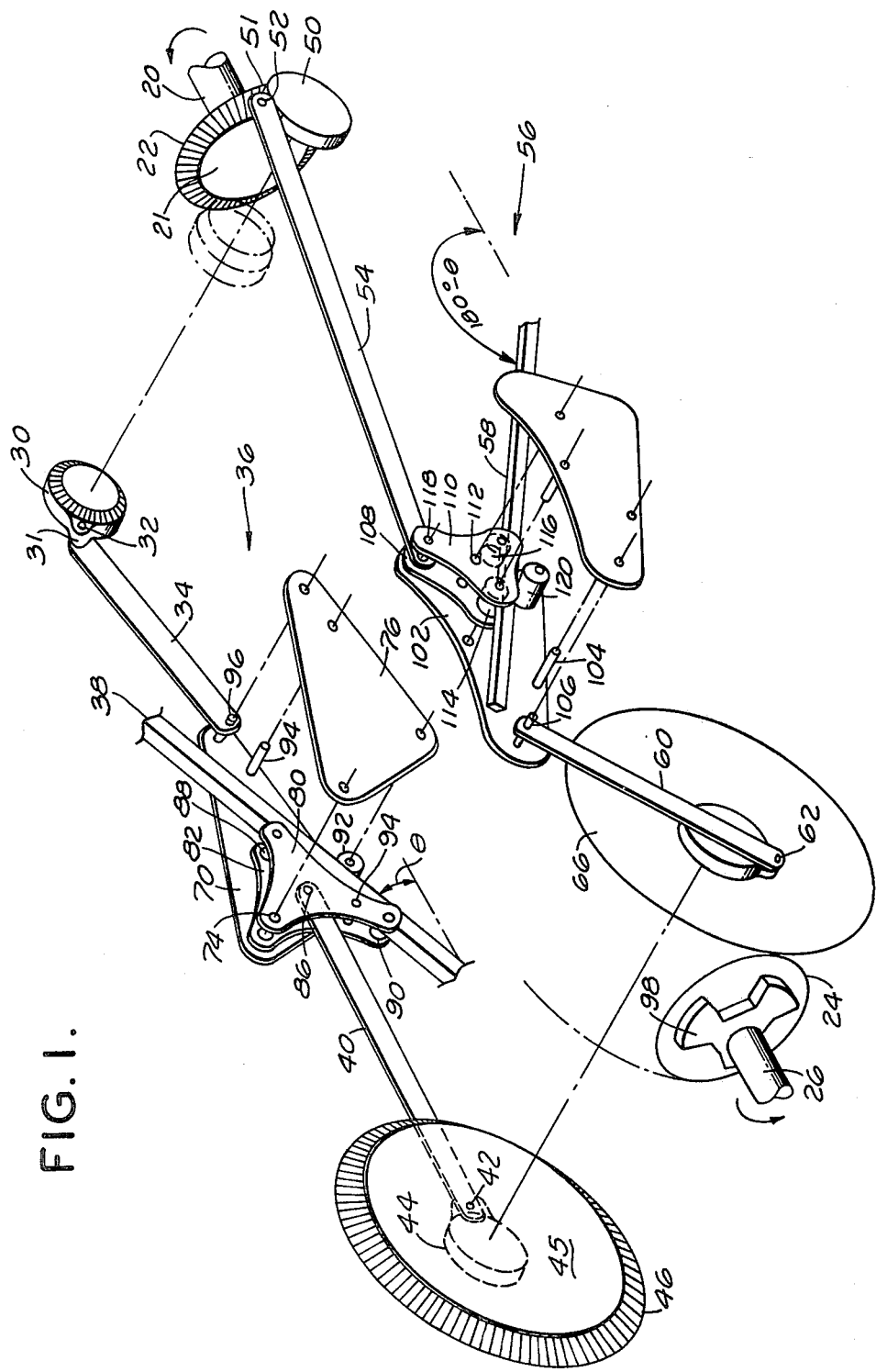
FIG. 1 is a pictorial view illustrating the various components of the present invention.

The oblique leverage transmission of the present invention is illustrated in FIG. 1 coupled between a first shaft 20 and a second shaft 26 whereby the first shaft 20 is rotated in response to a motor, engine or other motive force. Of course, it will be appreciated that while the motive force may be applied to the shaft 20 to obtain a rotational motion on the second shaft 26, in some applications it may be preferable to couple the second shaft 26 to the motive force.

A first gearing means is coupled to the first shaft 20 and comprises, in the preferred embodiment, a first drie gear 22 which is fixed to and rotated by the shaft 20. A first force transfer gear 30 and a second force transfer 50 are positioned about the periphery of the first drive gear 22 to be rotated thereby. The first drive gear 22 comprises a bevel gear which may, for example, be a four inch, 48 tooth gear. The first force transfer gear 30 is also preferably a bevel gear which, for example, may be a two inch gear with 24 teeth. The second force transfer gear 50 is also preferably a bevel gear and, for example, may also be a two inch gear with 24 teeth. The second force transfer gear 50 is positioned opposite to the first force transfer gear so that as the first drive gear 22 rotates, e.g., in a counter-clockwise direction as viewed looking at the face 21 of the first drive gear 22, the teeth of the first drive gear 22 will mesh with the teeth of the first force transfer gear 30 causing that gear to rotate in a clockwise direction as viewed from the face of the first force transfer gear 30. The teeth of the second force transfer gear 50 will also mesh with the teeth of the first drive gear 22 causing the second force transfer gear 50 to rotate in a counterclockwise direction as viewed looking towards the back of the second force transfer gear 50. Thus, the first gearing means comprises a first drive gear 2, a first force transfer gear 30, and a second force transfer gear 50 in an epicyclic bevel gear arrangement.

A first connecting rod 34 is rotatably coupled to a pin 32 fixed to and extending outwardly from a peripherally attached flange 31 on the first force transfer gear 30 to transform the rotational motion of the first force transfer gear 30 into reciprocating motion by the connecting rod 34. The opposite end of the connecting rod 34 is pivotally coupled to a first load transfer means 36 which is coupled so that as the connecting rod 34 reciprocates, the first load transfer means 36 moves up and down the first incline plane 38. A third connecting rod 40 is coupled to the opposite side of the first load transfer means in a manner to be described hereafter, and is further coupled to an eccentrically attached pin 42 on a third force transfer gear 46.

The third connecting rod 40 may be attached to the third force transfer gear 46 by attaching the connecting rod 40 to the pin 42 which may be attached either to a disk-shaped member 44 fixed to the backside of the gear 46 or may be attached directly to the back surface of the gear 46. It will be appreciated that the pin may be placed at any eccentric location about the back surface of the gear 46. However, the rotation of the pin 42 by the linkage must be either in phase with the rotational motion of the pin 32, in which case the rotational direction of the second shaft 26 will be reversed relative to the direction of rotation of the first shaft 22, or 180° out-of-phase with the rotation of the pin 32 on the first force transfer gear 30 in which case the second shaft 26 will rotate in the same direction as the shaft 20. FIG. 1 illustrates the arrangement where the pin 32 and the pin 42 are positionally 180° out-of-phase.

In operation, as the connecting rod 40 reciprocates back and forth with the pins 32 and 42 rotating at the same rate but at angular positions phase shifted 180°, the gear 46 rotates in a counter-clockwise direction as viewed from the face 45 of the bevel gear 46 and meshes with the teeth of a second drive gear 24 to cause the second drive gear 24 to rotate in a counterclockwise direction as viewed from the backside of the drive gear 24. Thus, the second shaft 26 rotates in the same direction as the first shaft 20.

In a similar fashion, a second connecting rod 54 is rotatably coupled by a pin 52 fixed to and extending outwardly from a peripherally attached flange 51, to the second force transfer gear 50 to transform the rotational motion of the second force transfer gear 50 to reciprocating motion. A second load transfer means 56, coupled to the other end of the second connecting rod 54, moves up and down a second incline plane 58 as the second force transfer gear 50 rotates. In the preferred embodiment of the present invention, the pin 52, fixed to the bevel gear 50, is positioned relative to the pin 32 fixed to the bevel gear 30, so as to lead the pin 52, as each is viewed rotating counter-clockwise, by 75°. This relative arrangement of the pins allows for substantial constant force being transferred from the shaft 20 through the transmission to the shaft 26 thereby allowing a substantially constant level of work energy transfer through the transmission. The first incline plane is positioned at an angle 180° $-\theta$, relative to a horizontal plane parallel to the plane defined by the axes of rotation of the first drive gear and the first force transfer gear where the transmission is viewed looking toward the back 45 of the gear 46. The second incline plane forms an angle $\theta$ relative to the horizontal plane as viewed looking toward the back 45 of the gear 46.

A fourth connecting rod 60 is coupled at one end to the opposite side of the second load transfer means 56, in a manner to be described hereafter, and to an eccentrically positioned pin 62 coupled to the backside of a fourth force transfer gear 66.

In operation, the teeth of the fourth force transfer gear 66 mesh with the teeth of the second drive gear 24 preferably at a location on the second drive gear which is at an angular location 180° from the location at which the third force transfer gear teeth mesh with the second drive gear 24. Thus, the second shaft 26 is rotated by a force applied at two locations on the second drive gear 24, namely where the teeth of the third force transfer gear 46 mesh with the gears of the second drive gear 24 and where the teeth of the fourth force transfer gear 64 mesh with the teeth of the second drive gear 24.

Figure 2:
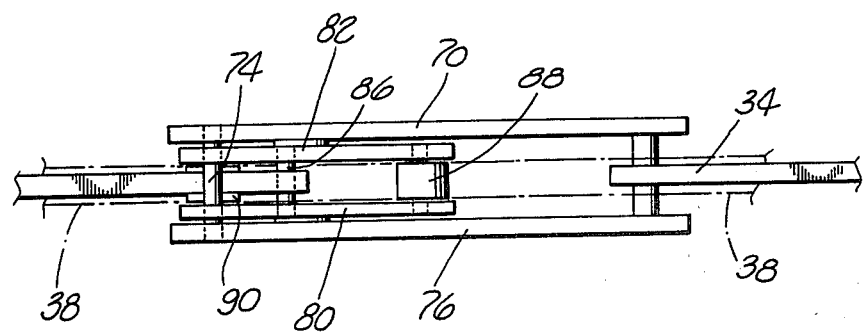
FIG. 2 is a top plan view of the first load transfer means illustrated in FIG. 1.

Referring now to FIG. 2 in conjunction with FIG. 1, the first load transfer means 36 is illustrated having an outside carriage plate 76 and an inside carriage plate 70 which are bolted together in spaced relationship by one or more connecting bolts and spacers 94. Fixed between the outside carriage plates 76 and the inside carriage plate 70 is a first connecting rod pin 96 to which the first connecting rod 34 is pivotally attached. In the preferred embodiment, the first connecting rod pin 96 is positioned to reciprocate below the incline plane 38.

The first load transfer means also comprises an outside lever plate 80 and an inside lever plate 82 where the lever plates are attached to pivot together relative to the inside and outside carriage plate assembly about a force arm pin 74. The force arm pin 74 is fixed between the outside carriage plate 76 and the inside carriage plate 70. Thus, the assembly comprising the lever plates is rotatable in the space between the outside carriage plate 76 and the inside carriage plate 70 about the force arm pin 74. In the embodiment illustrated, the lever plate assembly is a three-corner assembly, such as a triangle or modified triangle, having a first topside roller 88 rotatably fixed between the two lever plates at a first corner location and a second topside roller 90 rotatably positioned between the two lever plates at a second corner location with the force arm pin 74 passing through the third corner of the lever plate assembly. The first topside roller 88 and the second topside roller 90 are then positioned to roll along the top side of the incline plane 38 with an underside roller 92 attached between the outside carriage plate 76 and inside carriage plate 70 being positioned next to the bottom or lower side of the incline plane 38 to roll therealong.

A third connecting rod pin 86 is fixed between the outside lever plate 80 and the inside lever plate 82 at a location between the force arm pin 74 and the second topside roller 90 with the third connecting rod 40 being pivotally coupled to the third connecting rod pin 86.

In operation, as a pulling force, for example, is applied to the first connecting rod 34, a force is applied to the first load transfer means with a component of the force resisting movement of the shaft 26 and gears 24, 46, and 66, transferred to the incline plane 38 through the first topside roller 88. In a preferred alignment of the underside roller 92, a slight clearance is provided so that when the force is transferred to the inclined plane through the first topside roller 88, the second topside roller 90 is spaced above the inclined plane and vice versa when a pushing force is applied to the load transfer means through the first connecting rod 34. An acceptable spacing may, for example, be in the range of zero to ⅛". Thus, in operation, the lever plate assembly and the carriage assembly combine to perform the function of a second class lever with the force arm pin 74 being the force arm pivot location. When the lever acts, it transfers a component of the load being either pushed or pulled by the gears 46 and 66 to the incline plane.

The operation and principles of the incline plane are incorporated to mitigate the loss inherent in the operation of the gears 46 and 66.

The second load transfer means 56 is similar to the first load transfer means and comprises inside and outside carriage plates 100 and 102 bolted together in fixed relationship by one or more connecting bolts and spacers 104. Fixed between the outside carriage plate 102 and the inside carriage plate 100 is a fourth connecting rod pin 106 to which the fourth connecting rod 60 is pivotally attached. In the preferred embodiment, the fourth connecting rod pin 106 is positioned to reciprocate below the incline plane 58.

The second load transfer means also comprises an outside lever plate 108 and an inside lever plate 110 where the lever plates are attached to pivot together, relative to the inside and outside carriage plate assembly, about a force arm pin 112. The force arm pin 112 is fixed between the outside carriage plate 102 and the inside carriage plate 100. Thus, the assembly comprising the lever plates is rotatable in the space between the outside carriage plate 102 and the inside carriage plate 100 about the force arm pin 112. In the embodiment illustrated, the lever plate assembly is a three-corner assembly, such as a triangle or modified triangle, having a first topside roller 114 rotatably fixed between the two lever plates at a first corner location and a second topside roller 116 rotatably positioned between the two lever plates at a second corner location. A second connecting rod pin 118 is coupled through the third corner of the lever plate assembly. The second lever arm 54 is pivotally connected to the second connecting rod pin 118. The first topside roller 114 and the second topside roller 116 are then positioned to roll along the top side of the incline plane 58 with an underside roller 120 attached between the outside carriage plate 102 and inside carriage plate 100 being positioned next to the bottom or lower side of the incline plane 58 to roll therealong.

In operation, as a pushing force, for example, is applied to the second connecting rod 54, a force is applied to the second load transfer means with a component of the force resisting movement of the shaft 26 and gears 24, 46, and 66, transferred to the incline plane 58 through the first topside roller 114. In a preferred alignment of the underside roller 92, a slight clearance is provided so that when the force is transferred to the incline plane through the first topside roller 114, the second topside roller 116 is spaced above the incline plane and vice versa a pulling force is applied to the load transfer means through the first connecting rod 54. An acceptable spacing may, for example, be in the range of zero to ⅛". Thus, in operation, the lever plate assembly and the carriage assembly combine to perform the function of a second class lever with the force arm pin 112 being the force arm pivot location.

Figure 3:
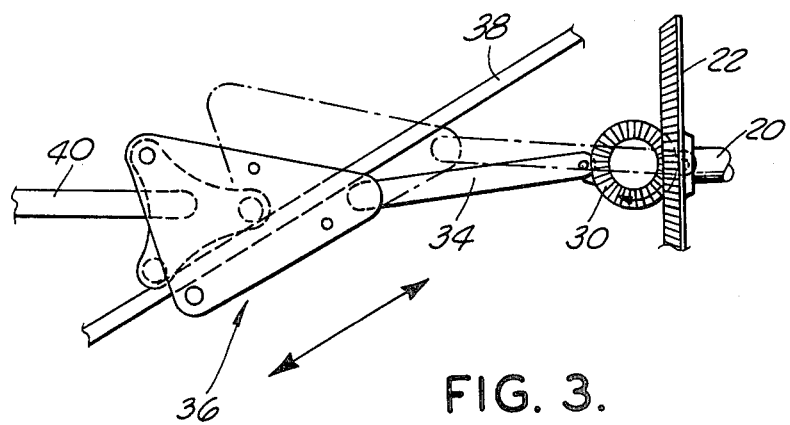
FIG. 3 is a diagrammatic plan view illustrating the movement of the first load transfer means along the first incline plane.

Referring finally to FIG. 3, the first load transfer means 36 is illustrated in two alternate positions to show the movement of the carriage along the incline plane 38.

Although the incline planes 38 and 58 may be at any angle $\theta$ relative to the horizontal plane, in the preferred embodiment the angle is greater than 0° and less than 45° and preferably 30°.

In one illustrative embodiment, for example, the first drive gear 22 is a four-inch, 48 tooth bevel gear with the first force transfer gear and the second force transfer gear being each two-inch, 24 tooth bevel gears. The third force transfer gear is then preferably an eight-inch, 96 tooth gear with the pin 42 being positioned on a 1¼" radius, at an angular distance shifted 180° relative to the pin 32. The pin 32 is placed on a 15/32" radius of the first force transfer gear 30 by providing the peripheral flange 31 on the two-inch bevel gear 30. Similarly, the fourth force transfer gear 66 is an eight-inch, 96 tooth bevel gear with the pin 62 being fixed at a 1¼" radius at an angular distance shifted 180° relative to the pin 52 in the second bevel gear 50. The pin 52 is placed on a 1 5/32" radius of the second force transfer gear 50 by providing the peripheral flange 51 on the two-inch bevel gear 50. Finally, the second drive gear is a four-inch, 48 tooth bevel gear. In such an arrangement, the second shaft 26 will rotate at four times the rotational rate of the first shaft. In addition, the incline planes 38 and 58 are each positioned at angles of 30° and 150° respectively, relative to the horizontal plane as viewed looking toward the face 45 of the gear 46.

In another embodiment of the present invention, one or more weights 98 may be positioned, preferably symmetrically, about the periphery of the second drive shaft 24, the first drive shaft 22 or one or more of the force transfer gears to provide an energy storage capability of the various rotating members in accordance with the principles of the flywheel.

In summary, therefore, the oblique leverage transmission coupled between the first shaft 20 and the second shaft 26 comprises means for translating single rotational motion in a first plane defined by the first drive gear 22 to rotational motion in each of a first pair of parallel planes perpendicular to the first plane defined by the plane of rotation of the force transfer gears 30 and 50 respectively. The rotational motion of the force transfer gears 30 and 50 are then linearized in a second pair of planes parallel to the first pair of planes defined by the first connecting rod 34 and the second connecting rod 54. The linearized motion in the second pair of parallel planes is then transferred to an incline surface in a third pair of parallel planes defined by the incline planes 38 and 58 respectively which are again parallel to the second pair of parallel planes. The linear motion along the third pair of parallel planes is transferred to rotational motion in a fourth pair of parallel planes defined by the rotational plane of the third force transfer gear 46 and the fourth force transfer gears 66 parallel to the third pair of parallel planes. The rotational motion in the fourth pair of parallel planes are combined to provide rotational motion of the second drive gear in a single plane perpendicular to the fourth pair of parallel planes.

It will be appreciated that other dimensions, angles, and gear ratios are possible without departing from the spirit of the present invention and that the above arrangement is illustrative only and is not to be taken in a limiting sense.

What is claimed is:

1. An oblique leverage transmission coupled between a first shaft and a second shaft, comprising:
   first gearing means coupled for being rotated by the first shaft, the first gearing means comprising at least a first force transfer gear and a second force transfer gear;
   second gearing means comprising at least a third force transfer gear and a fourth force transfer gear, the second shaft coupled for being rotated in response to the rotation of the third force transfer gear and the fourth force transfer gear;
   inclined plane means comprising:
   a first inclined plane positioned between the first and third force transfer gears, and
   a second inclined plane positioned between the second and fourth force transfer gears; and linkage means comprising:
   first load transfer means coupled for being moved linearly up and down the first inclined plane in response to the rotation of the first force transfer gear and further coupled to rotate the third force transfer gear as the first load transfer means moves linearly up and down the inclined plane, and
   second load transfer means coupled for being moved linearly up and down the second inclined plane in response to the rotation of the second force transfer gear and further coupled for rotating the fourth force transfer gear as the second load transfer means moves linearly up and down the inclined plane.

2. The transmission of claim 1 wherein the first gearing means further comprises:
   a first drive gear fixed for being rotated by the first shaft, the first drive gear, the first force transfer gear and the second force transfer gear being bevel gears, the first force transfer gear being meshed with the first drive gear at a first location and the second force transfer gear being meshed with the first drive gear at a second location opposite the first location; and
   the second gearing means further comprising:
   a second drive gear fixed for rotating the second shaft, the second drive gear, the third force transfer gear and the fourth force transfer gear being bevel gears, the third force transfer gear being meshed with the second drive gear at a third location and the fourth force transfer gear being meshed with the second drive gear at a fourth location opposite the third location.

3. The transmission of claim 2 wherein the gear ratio is selected so that the first and second force transfer gears rotate at an angular rate greater than the angular rate of rotation of the first drive gear.

4. The transmission of claim 2 wherein the gear ratio is selected so that the second drive gear rotates at four times the angular rate of the first force transfer gear.

5. The transmission of claim 2 wherein the first force transfer gear, the second force transfer gear, the third force transfer gear and the fourth force transfer gear rotate at the same angular rate.

6. The transmission of claim 1 wherein the inclined planes have an incline angle greater than zero degrees and less than about 45°.

7. The transmission of claim 1 wherein the inclined planes have an incline angle of 30°.

8. The transmission of claim 1 further comprising at least one weight fixed to the periphery of at least one of the first drive gear and the second drive gear for providing a flywheel energy storage means.

9. The transmission of claim 1 further comprising:
   a first connecting rod eccentrically coupled at one of its ends to the first force transfer gear and at the other of its ends to the first load transfer means;
   a third connecting rod eccentrially coupled at one of its ends to the third force transfer gear and at the other of its ends to the first load transfer means;
   a second connecting rod eccentrially coupled at one of its ends to the third force transfer gear and at the other of its ends to the first load transfer means;

a fourth connecting rod eccentrically coupled at one of its ends to the fourth force transfer gear and at the other of its ends to the second load transfer means.

10. The transmission of claim 9 wherein the first load transfer means comprises:
   a first carriage assembly attached to the other end of the first connecting rod and having a first rotatably mounted wheel for rolling along the underside of the first inclined plane member and a first force arm pivot connection positioned on the first carriage assembly above the top side of the first incline plane member;
   a first second class lever assembly having a center region to which is attached the other end of the third connecting rod, an upper region pivotally attached to the first force arm pivot connection of the first carriage assembly, and a lower region, at least two first spaced wheels rotatably connected thereto for being rolled along the top side of the first inclined plane as the first force transfer gear rotates; and
   a second carriage assembly attached to the other end of the fourth connecting rod and having a third rotatably mounted wheel for rolling along the underside of the second inclined plane member and a second force arm pivot connection on the second carriage assembly above the top side of the second incline plane member; and
   a second, second class lever assembly having an upper region to which the other end of the second connecting rod is pivotally attached, a center region at which the second lever assembly is pivotally attached to the second carriage assembly, and a lower region, at least two second spaced wheels rotatably connected thereto for being rolled along the top side of the second inclined plane as the second force transfer gear rotates.

11. The transmission of claim 1 wherein the second shaft is coupled to be rotated in the same direction as the first shaft.

12. The transmission of claim 1 wherein the second shaft is coupled to be rotated in the opposite direction of the first shaft.

13. The transmission of claim 1 wherein the first inclined plane is inclined at an angle of $\theta°$ and the second inclined plane is inclined at an angle $180° - \theta°$ relative to a horizontal plane parallel to the plane defined by the axes of rotation of the first drive gear and the first force transfer gear.

14. The transmission of claim 13 wherein the angle $\theta$ is greater than 0° and less than about 45°.

15. The transmission of claim 13 wherein the angle $\theta$ is 30°.

16. An oblique transmission coupled between a first shaft and a second shaft comprising:
   means for translating single rotational motion in a first plane to rotational motion in each of a first pair of parallel planes perpendicular to the first plane;
   means for linearizing each rotational motion in a second pair of parallel planes, parallel to the first pair of parallel planes;
   means for transferring the linearized motion in the second pair of parallel planes to an inclined surface in a third pair of parallel planes, parallel to the second pair of parallel planes;
   means for transferring the motion along the inclined surface in the third pair of parallel planes to rotational motion in a fourth pair of parallel planes, parallel to the third pair of parallel planes; and
   means for combining the rotational motion in the fourth pair of parallel planes to rotational motion in a single plane perpendicular to the fourth pair of parallel planes.

* * * * *

UNITED STATES PATENT AND TRADEMARK OFFICE
CERTIFICATE OF CORRECTION

PATENT NO. : 4,186,614
DATED : February 5, 1980
INVENTOR(S) : FRED A. HAMLIN

It is certified that error appears in the above-identified patent and that said Letters Patent are hereby corrected as shown below:

Column 3, line 38: "drie" should be changed to "drive".

Column 3, line 62: "gear 2" should be changed to "gear 22".

Column 4, line 25: insert the word "first" between the words "the" and "shaft", so phrase should read "as the first shaft 20".

Column 6, line 50: insert the word "when" between the words "versa" and "a", so phrase should read "vice versa when a pulling force".

Column 7, line 3: $\frac{15}{32}$ should be changed to $1\frac{5}{32}$

Column 7, lines 9 and 10: the numbers $1\frac{5}{32}$ should be joined in one line to make the meaning clear Signed and Sealed this Tenth Day of June 1980

[SEAL]

Attest:

SIDNEY A. DIAMOND

*Attesting Officer*     *Commissioner of Patents and Trademark*